(12) United States Patent
Dumanski et al.

(10) Patent No.: US 10,400,816 B2
(45) Date of Patent: Sep. 3, 2019

(54) BEARING COVER

(71) Applicant: Miba Sinter Austria GmbH, Laakirchen (AT)

(72) Inventors: Christian Dumanski, Plesching-Steyregg (AT); Markus Schauer, Gunskirchen (AT); Franz-Josef Gielesberger, Ohlsdorf (AT)

(73) Assignee: Miba Sinter Austria GmbH, Laakirchen (AT)

( * ) Notice: Subject to any disclaimer, the term of this patent is extended or adjusted under 35 U.S.C. 154(b) by 0 days.

(21) Appl. No.: 16/056,640

(22) Filed: Aug. 7, 2018

(65) Prior Publication Data

US 2019/0085892 A1  Mar. 21, 2019

(30) Foreign Application Priority Data

Sep. 15, 2017 (AT) .............................. A 50774/2017

(51) Int. Cl.
  *F16C 9/02* (2006.01)
  *F16C 35/02* (2006.01)
  *F16C 33/04* (2006.01)

(52) U.S. Cl.
  CPC .............. *F16C 9/02* (2013.01); *F16C 35/02* (2013.01); *F16C 33/046* (2013.01); *F16C 2223/30* (2013.01); *F16C 2226/70* (2013.01)

(58) Field of Classification Search
  CPC .... F16C 9/02; F16C 2226/70; F16C 2223/40; F16C 33/046; F02F 7/0053; F02F 2007/0056
  See application file for complete search history.

(56) References Cited

U.S. PATENT DOCUMENTS

| 5,387,472 | A | * | 2/1995 | Shimmell | B22D 15/02 |
|---|---|---|---|---|---|
| | | | | | 428/542.8 |
| 5,905,939 | A | * | 5/1999 | Ishijima | B22F 5/003 |
| | | | | | 419/28 |
| 6,086,258 | A | | 7/2000 | Cadle et al. | |
| 6,431,759 | B1 | | 8/2002 | Luchner et al. | |
| 6,435,723 | B1 | | 8/2002 | Wolf et al. | |
| 6,471,406 | B1 | * | 10/2002 | Cadle | B22F 5/00 |
| | | | | | 384/433 |
| 8,690,439 | B2 | | 4/2014 | Dickinger et al. | |

(Continued)

FOREIGN PATENT DOCUMENTS

| AT | 507 265 A1 | 3/2010 |
|---|---|---|
| CA | 2 635 263 A1 | 7/2007 |

(Continued)

*Primary Examiner* — Alan B Waits

(74) *Attorney, Agent, or Firm* — Collard & Roe, P.C.

(57) ABSTRACT

The invention relates to a bearing cover (3) for a split bearing arrangement (1), which comprises a bearing block (2) in addition to the bearing cover (3), wherein the bearing cover (3) has a clamping surface (6), which in an assembled state of the bearing arrangement (1) fits against a counter clamping surface (5) of the bearing block (2), and wherein at least one projection (7) is formed on the clamping surface (6) and projects from the latter, which can be pushed into the counter clamping surface (5) of the bearing block (2), and which has a round or round-convex cross-sectional form in a plan view of the clamping surface (6).

6 Claims, 4 Drawing Sheets

(56) References Cited

U.S. PATENT DOCUMENTS

| | | | |
|---|---|---|---|
| 8,840,315 B2 | 9/2014 | Stork et al. | |
| 8,915,230 B2 | 12/2014 | Brautigam | |
| 9,273,733 B2* | 3/2016 | Draxler | F16C 35/02 |
| 9,528,555 B2 | 12/2016 | Draxler et al. | |
| 2011/0064350 A1* | 3/2011 | Yamakawa | F16C 9/02 |
| | | | 384/577 |
| 2011/0158569 A1* | 6/2011 | Dickinger | F16C 9/02 |
| | | | 384/434 |
| 2013/0146018 A1* | 6/2013 | Brautigam | B23P 15/003 |
| | | | 123/195 R |
| 2015/0055902 A1* | 2/2015 | Draxler | F16C 35/02 |
| | | | 384/434 |
| 2017/0016479 A1* | 1/2017 | Siessl | F16C 33/046 |

FOREIGN PATENT DOCUMENTS

| | | |
|---|---|---|
| DE | 198 19 080 A1 | 11/1999 |
| DE | 100 01 781 C1 | 5/2001 |
| DE | 697 13 764 T2 | 2/2003 |
| DE | 11 2013 002 230 T5 | 1/2015 |
| EP | 1 118 780 B1 | 7/2001 |
| EP | 0 897 485 B1 | 7/2002 |
| EP | 1 075 605 B1 | 1/2004 |
| EP | 2 602 498 B1 | 6/2013 |
| WO | 2007/081715 A2 | 7/2007 |
| WO | 2013/163410 A1 | 10/2013 |
| WO | 2016/030569 A1 | 3/2016 |

\* cited by examiner

BEARING COVER

CROSS REFERENCE TO RELATED APPLICATIONS

Applicant claims priority under 35 U.S.C. § 119 of Austrian Application No. A 50774/2017 filed on Sep. 15, 2017, the disclosure of which is incorporated by reference.

The invention relates to a bearing cover for a split bearing arrangement which comprises a bearing block in addition to the bearing cover, wherein the bearing cover has a clamping surface, which in the assembled state of the bearing arrangement fits against a counter clamping surface of the bearing block and wherein at least one projection is formed on the clamping surface and projects from the latter which can be pushed into the counter clamping surface of the bearing block.

In addition, the invention relates to a bearing arrangement with a bearing cover and a bearing block fitting onto the latter.

Split bearing arrangements with a bearing block and a bearing cover are known from the prior art, for example for supporting a crankshaft. The bearing cover is screwed by threaded bolts onto the bearing block. Thus for example from EP 1 075 605 B1 a split bearing arrangement is known in a housing, in particular a crankshaft sliding bearing for reciprocating engines, comprising a bearing block and a bearing cover made from materials of varying hardness, wherein the bearing cover which can be clamped onto the bearing block and is made from an iron material has sharp-edged pointed projections protruding from its clamping surface, which during the initial assembly of the bearing cover can be pushed with the application of force into the counter clamping surface of the bearing block made from a light material and wherein also grooves are provided in the clamping surface of the bearing cover. The projections are designed to have a cutting edge or pyramid profile, wherein the projections have a cutting edge angle of 50° to 110°. The height of the cutting edge above the clamping surface of the bearing cover is between 0.25 mm and 1.5 mm. The grooves adjoin the cutting edge sides of the projections and are recessed into the clamping surface, wherein said grooves are rounded with a radius of 0.15 mm to 0.30 mm. Said grooves are used for receiving the material of the bearing block forced into the bearing block when pushing in the projections.

Further examples of such projections on clamping surfaces are known from EP1 075 605 B1, DE 198 19 080 A, EP 1 118 780 B1, WO 2007/081715 A2, U.S. Pat. No. 8,840,315 B2, EP 2 602 498 B1, WO 2013/163410 A1, EP 0 897 485 B1 and AT 507 265 A1.

The objective of the present invention is to create a bearing cover or a split bearing arrangement, by means of which or with which the bearing cover can be clamped more effectively onto the bearing block.

The objective of the invention is achieved with the aforementioned bearing cover in that the at least one projection has a round or round-convex cross-sectional form in a plan view of the clamping surface.

Furthermore, the objective of the invention is achieved by the aforementioned bearing arrangement, wherein the bearing cover is designed according to the invention.

By having a round or round convex cross-sectional form, compared to the known embodiments of such position fixings or positioning attachments, the projection has a much lower notching effect, even at the end sections of the projection. It is an advantage here that by means of this design of the bearing cover it is possible to reduce tensions in the bearing mount, whereby then also the forces and tensions introduced into the sliding bearing or bearings caused by the clamping of the bearing cover to the bearing block can be reduced. The sliding bearing or bearings can thus be held more protectively in the bearing mount, and their service life can thus be increased.

Said improvements are particularly noticeable if, according to one embodiment variant, the at least one projection is designed in the form of spherical segment or ellipsoid segment.

According to another embodiment variant it is possible to form a recess in the clamping surface, wherein the projection is arranged between said recess and a bearing surface of the bearing cover. Although in itself the arrangement of the projections at the two other end sections of the clamping surfaces seems obvious for safety reasons, the projections, due to the reduced notching effect, can be positioned very close to the bearing mount surfaces. This has the advantage that the positioning and fixing of the bearing cover can be improved in the area of the bearing mount surfaces.

To further improve the said effect it is possible for the projection to be arranged at a distance from the beginning of the bearing surface which is at least 25% of the maximum diameter and a maximum of 300% of the maximum diameter of the projection.

A further reduction of the notching effect of the projection when clamping together the bearing cover and the bearing block can be achieved according to another embodiment variant of the bearing cover by designing a transition from the clamping surface to the projection to be rounded.

To further reduce the notching effect of the projection it is also possible for the projection to have a diameter of at least 0.2 mm and a maximum of 4 mm.

It is possible to improve the repositioning of the bearing cover on the bearing block with a reduced notching effect if at least one additional elevation is formed on the surface of the projection. In this way at least one additional positioning option is provided in that an additional depression is formed in the depression in the counter clamping surface. Said additional depression enables the more precise repositioning of the bearing cover. In addition, the material of the bearing block can also yield more easily when clamping the bearing cover and bearing block.

For a better understanding of the invention the latter is explained in more detail with reference to the following figures.

In a much simplified, schematic representation:

Figure 1:
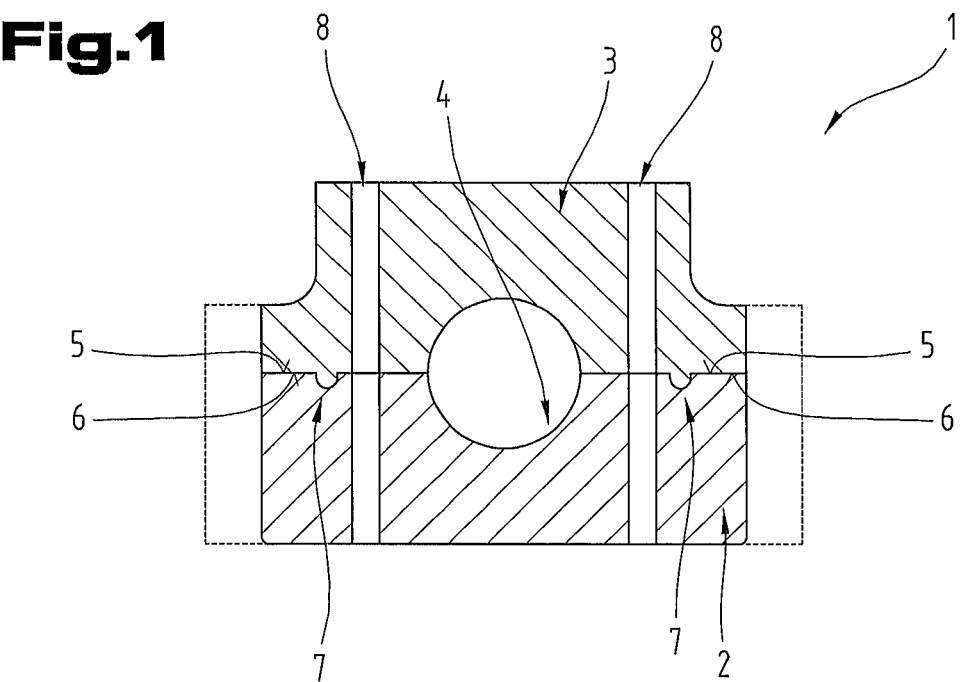
FIG. 1 is a split bearing arrangement in cross-section.
Figure 2:
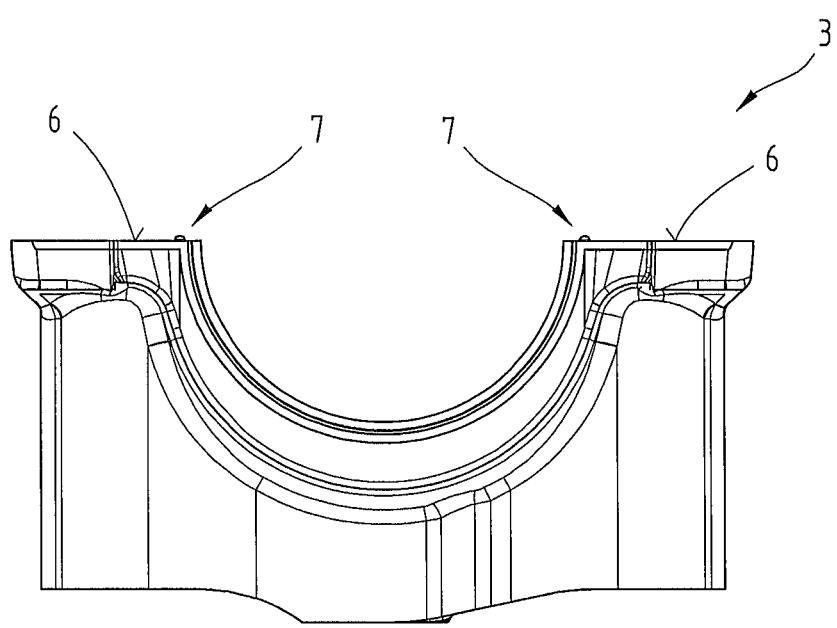
FIG. 2 is an embodiment variant of a bearing cover in side view.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

FIG. 1 shows a split bearing arrangement 1, as used for example in a reciprocating engine. Said bearing arrangement 1 comprises a bearing block 2 and a bearing cover 3, which together form a bearing mount 4 for a sliding bearing, for example for a crankshaft. The bearing block 2 has at both distal end sections a counter clamping surface 5 and the bearing cover 3 at its two end sections has clamping surfaces 6 opposite the counter clamping surfaces 5. Projecting over the clamping surfaces 6 on the latter there is at least one projection 7 per clamping surface 6, which in the assembled state of the bearing arrangement 1 are pushed into the counter clamping surface 5 of the bearing block 2 by clamping together the bearing block 2 and bearing cover 3. For clamping the bearing block 2 onto the bearing cover 3 in the distal end sections a recess is arranged in the form of a continuous bore 8. In said bore 8 a bolt is mounted which is not shown in more detail. The tensioning can be achieved by means of corresponding nuts which are screwed onto the bolts. Alternatively, in the bearing block 2 and/or in the bearing cover 3 said bore 8 can be designed not to be continuous, but as a blind bore with an internal thread.

It is also possible, as indicated by dashed lines in FIG. 1, that the distal end sections of the bearing cover 3 are designed to overgrip laterally in the direction of the bearing block 2. Likewise the reverse is possible in that the bearing cover 3 is partly mounted in a recess of the bearing block 2.

At least the projections 7 are made from a material which is harder than the material of the bearing block 2 in the area of the counter clamping surface 5, so that said projections 7 can be pushed into the counter clamping surface 5 by pushing together and clamping the bearing block 2 and bearing cover 3. Preferably however, the whole bearing cover 3 is made from this harder material. For example, the bearing cover 3 can be made from an iron material and the bearing block 2 from a light metal. In particular, the bearing cover 3 can be made from a sintered iron material.

However, it is also possible to reverse the design by making the bearing block 2 harder, i.e. the bearing cover 3 or the projections 7.

The sliding bearing can be produced by directly coating the corresponding surfaces of the bearing mount 4 of the bearing block 2 and the bearing cover 3, it is also possible that known sliding bearing half shells can be used or the sliding bearing can also be designed to be geometrically different.

The projections 7 are shown more clearly in FIGS. 2 to 5, which show the bearing cover 3 in different representations.

In FIGS. 2 to 5 an embodiment variant of the bearing cover 3 is shown in different views.

Figure 5:
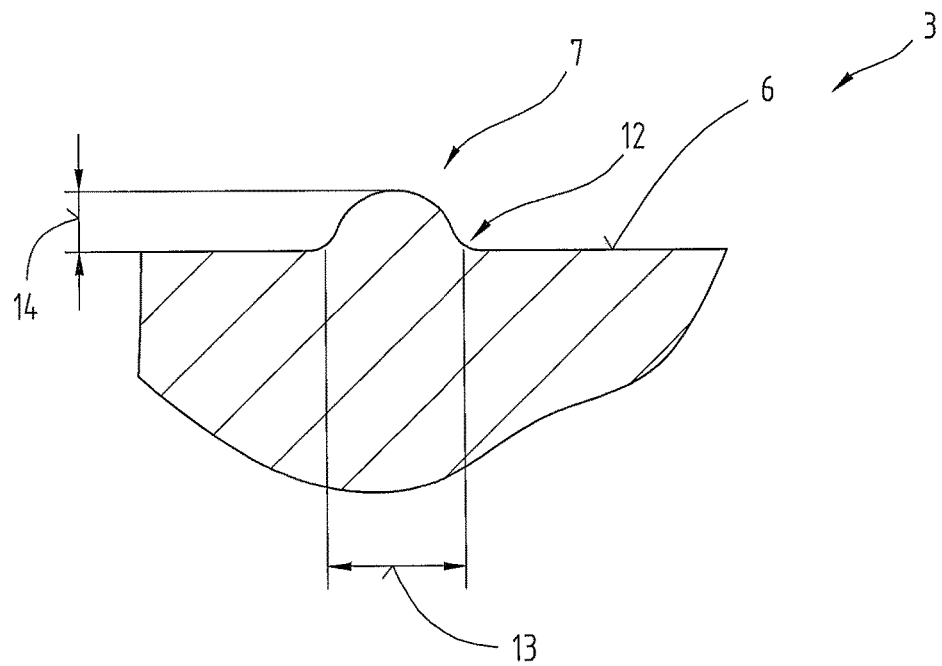
FIG. 5 is a detail of the bearing cover of FIG. 1.

In this embodiment variant the projections 7 projecting from the clamping surfaces 6 have a round, in particular circular round, cross-sectional form. The cross-sectional form of the projection 7 is shown in a plan view of the clamping surface 6. In particular, the projections 7 are designed in the form of spherical segments, particularly preferably in form of hemispherical segments, as shown in FIG. 5, which shows a section of a projection 7 corresponding to the line V-V in FIG. 3. Thus with each section parallel to the clamping surface 6 of the projections a circular cross-sectional shape is obtained.

In the specifically shown embodiment of the bearing cover 3 there are a total of four projections 7, wherein there are two for each clamping surface 6. This number of projections 7 should not be considered restrictive however, even if it is a preferred number. In general there can be between one and twenty projections 7 for each clamping surface 6 of the bearing cover 3. A plurality of projections 7 can be provided or formed particularly if the projections 7 are also used for the transfer of radial force.

Figure 6:
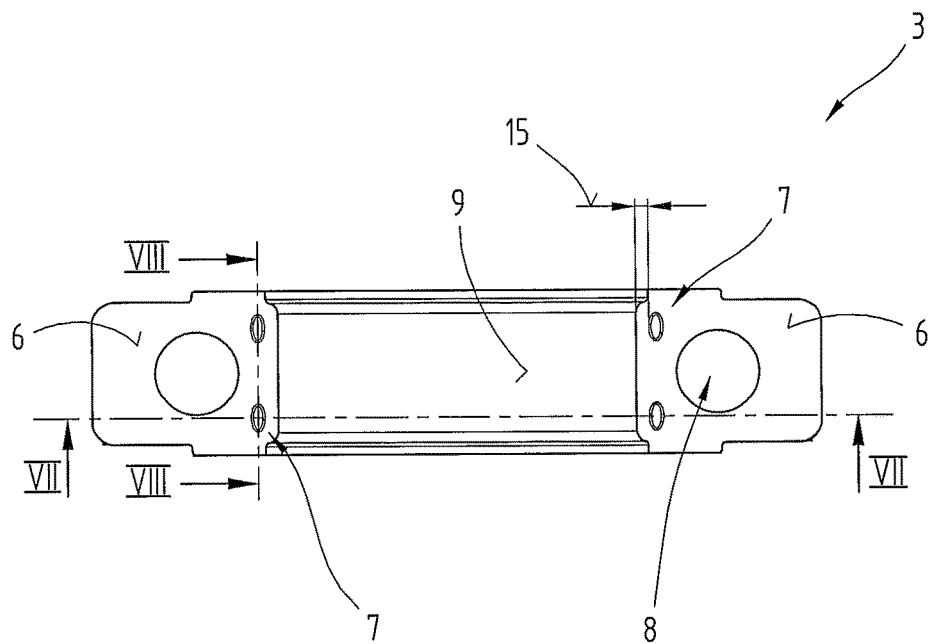
FIG. 6 is another embodiment variant of a bearing cover in plan view of the clamping surfaces.
Figure 7:
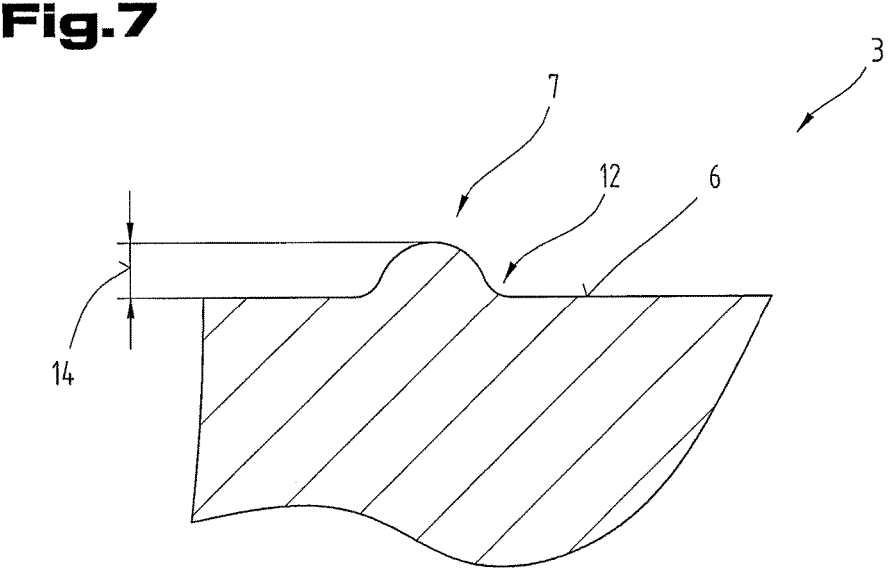
FIG. 7 is a detail of the bearing cover of FIG. 6.
Figure 8:
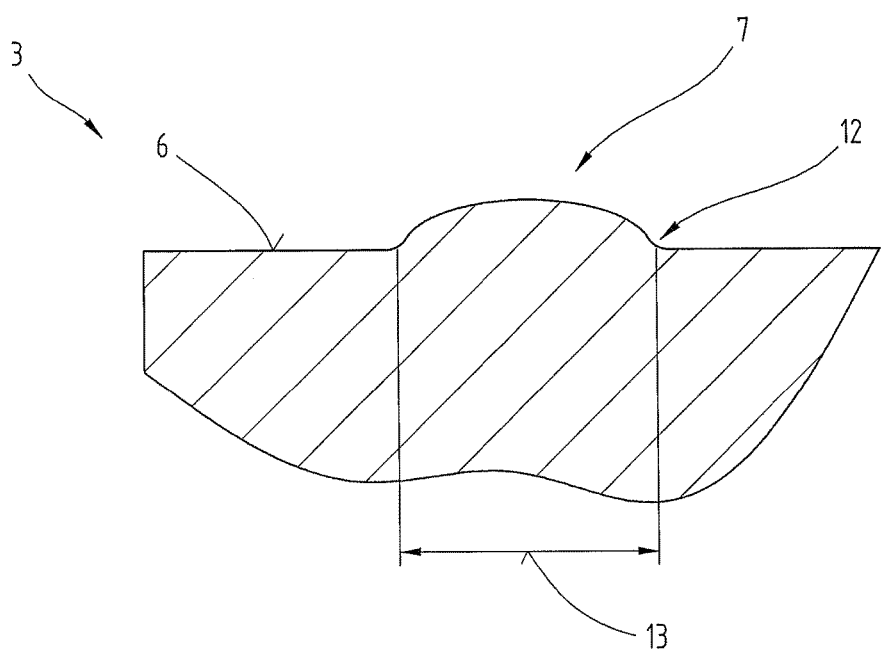
FIG. 8 is a further detail of the bearing cover of FIG. 6.

FIGS. 6 to 8 show different views of a further embodiment variant of the bearing cover 3.

Unlike the embodiment variant of the bearing cover 3 according to FIGS. 2 to 5 in this embodiment variant the projections 7 protruding from the clamping surfaces 6 have a round convex cross-sectional form, as viewed in a plan view of the clamping surfaces 6 of the bearing cover 3.

The term "round convex" is defined as a geometric cross-sectional form, if for any two points which are within the cross-sectional form, the connecting section of the latter is fully within the cross-sectional form.

However, it is possible that the transitions from the clamping surface 6 to the projections 7 are concave. The remainder of the projections 7 in this case also have a round convex cross-sectional form.

Preferably, the projections 7 are designed in the form of ellipsoid segments, as shown in an overview of FIGS. 6 to 8. In this case FIG. 7 shows a cross-section of a projection 7 according to line VII-VII in FIG. 6 and FIG. 8 shows a cross-section of a projection 8 according to line VIII-VIII in FIG. 6.

The at least one projection 7 can however also have a different cross-sectional form than round convex (as viewed in plan view on the clamping surface 6), for example cam-like or egg-like etc.

It should be noted for completeness that the following explanations apply to all embodiment variants of the bearing cover 3, even if they are only explained with reference to one embodiment variant of the bearing cover 3 and unless otherwise stated.

As already explained above, the bearing cover in the area of the clamping surfaces 6 comprises respectively the at least one bore 8. Said bores 8 divide the clamping surfaces 6 into a clamping surface part 10 closer to a bearing mount surface 9 of the bearing mount 4 (FIG. 1) and a more remote clamping surface part 11 (shown respectively in FIG. 3). The closer clamping surface parts 10 are thus formed between the bore 8 and the bearing mount surface 9.

In the two embodiment variants shown in FIGS. 2 to 8 the projections 7 are formed or arranged exclusively on the closer clamping surface parts 10, i.e. between the bore 8 and the bearing mount surface 9.

However, it is also still possible that the projections 7 are arranged exclusively on the more remote clamping surface parts 11 on the side of the bores 8 facing away from the bearing mount surface 4, as shown in FIG. 1.

In addition, the projections can be arranged on all of the clamping surface parts 10, 11.

As shown in particular in FIGS. 5, 7 and 8, according to another embodiment variant of the bearing cover, it is also possible for a transition from the clamping surface 6 to the projection 7 to have a rounding 12, i.e. is designed to be rounded. The radius of the rounding 12 can be selected from a range of 0.02 to 0.5.

According to one embodiment variant the rounding 12 can have a plurality of radii, which are all preferably selected from the aforementioned range for the radius of the rounding 12.

According to another embodiment variant of the bearing cover 3 it is also possible for the projection 7 or the projections 7 to have a diameter 13 of at least 0.2 mm and a maximum of 4 mm, in particular between at least 0.2 mm and a maximum 2 mm or between at least 1 mm and a maximum of 2 mm. The diameter 13 is always defined here as the maximum diameter 13, i.e. the diameter 13 which is greatest of each projection 7. In the embodiment variant of the bearing cover 3 according to FIGS. 6 to 8 the diameter 13 corresponds to the diameter that the enveloping circle defines, by which the cross-section of the projection 7 is then enveloped at the clamping surface 6, i.e. the maximum longitudinal dimension of the elliptical cross-sectional form.

With round convex cross-sectional forms of the projections 7 the dimension of the cross-section in a direction perpendicular to the diameter 13 and in a plane with the diameter 12 is preferably smaller than the diameter 13. In particular, the diameter 13 can be two to eight times greater than the said dimension.

The projections 7 can have a height 14 above the clamping surface 6, which is selected from a range of 0.2 mm to 1 mm.

Figure 3:
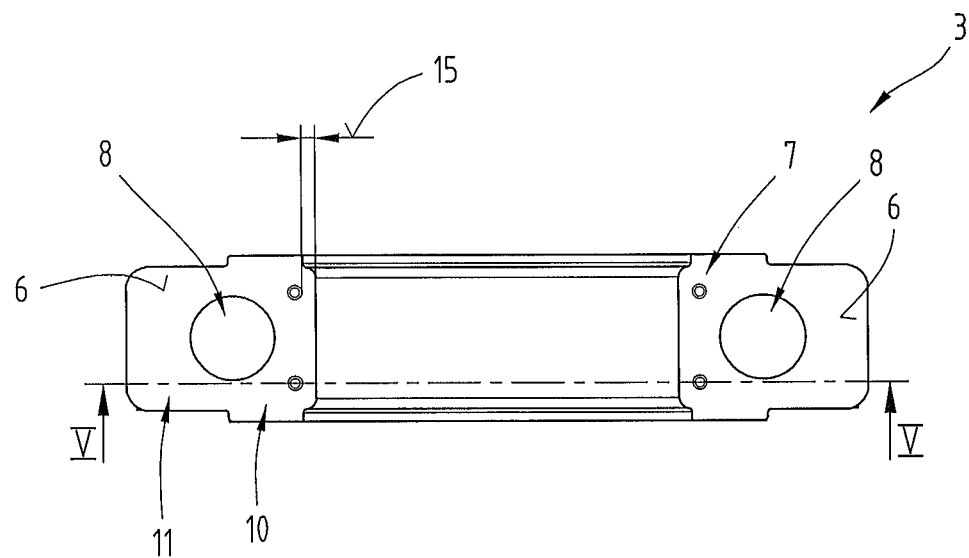
FIG. 3 is the bearing cover according to FIG. 1 in a plan view of the clamping surfaces.

The projections 7 can be arranged at a distance 15 from the beginning of the bearing mount surface 9 which is at least 25% of the maximum diameter 13 and a maximum of 300% of the maximum diameter 13, in particular at least 50% of the maximum diameter 13 and a maximum of 150% of the maximum diameter 13, of the respective projection 7. The distance 15 is determined by the projection 7 in the direction perpendicular to the bearing mount surface 4, as shown in FIGS. 3 and 6.

According to a further, not shown embodiment variant of the bearing cover 3 it is also possible that at least one additional elevation is formed on the surface of the projection 7.

In general, all of the projections 7 of a bearing cover 3 can be designed to be identical. However, it is also possible that for each bearing cover 3 or for each clamping surface 5 projections 7 with different cross-sectional forms are arranged or have an identical cross-sectional form with a displacement in position, in order to improve and/or simplify the correct assembly of bearing cover 3 and bearing block 2 after a separation.

Preferably, the projections 7 are designed in one piece with the rest of the bearing cover 7, i.e. are made from the material of the bearing cover and at the same time as the rest of the bearing cover 3.

It is also possible that depressions are formed in the clamping surfaces 6 around the projections 7, in particular groove-like depressions. In this way it is possible to simplify the process of pushing the projections 7 into the counter clamping surfaces 5.

Although it has always been assumed above that the projections 7 are formed exclusively on the clamping surfaces 6 of the bearing cover 3, it is also possible that the projections 7 are formed exclusively on counter clamping surfaces 5 of the bearing block 2. Likewise embodiment variants of the bearing arrangement can be provided in which the projections 7 are arranged or formed both on the clamping surfaces 6 and also on the counter clamping surfaces 5.

Figure 4:
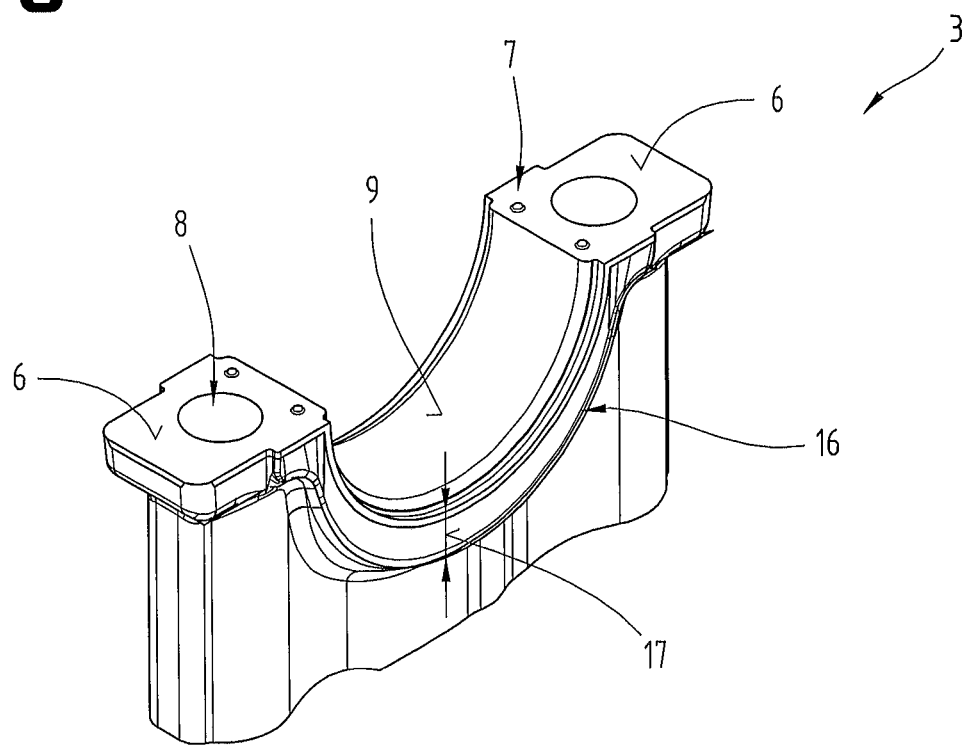
FIG. 4 is the bearing cover of FIG. 1 in perspective view.

It is also possible that the bearing cover 3 then has a reinforcing web 16 following the bearing mount surface 9 and the cross-sectional profile of the bearing mount surface 9, as shown in FIG. 4. The reinforcing web 16 can also have a varying height 17 as viewed perpendicular to the bearing mount surface 4, wherein the greatest height 17 is in the area of the half angular cover of the bearing mount surface 4.

The reinforcing web 16 can also be formed above the clamping surfaces 6.

Furthermore, a transition of the reinforcing web 16 above the clamping surfaces 6 on the reinforcing web 16 above the bearing mount surface 4 can be provided with a rounding.

The embodiments show possible embodiment variants of the bearing cover 3, wherein it should be noted at this point that also various combinations of the individual embodiment variants are possible.

Finally, as a point of formality, it should be noted that for a better understanding of the bearing arrangement 1 or bearing cover 3 the latter have not necessarily been represented true to scale.

LIST OF REFERENCE NUMERALS 1 bearing arrangement
2 bearing block
3 bearing cover
4 bearing mount
5 counter clamping surface
6 clamping surface
7 projection
8 bore
9 bearing mount surface
10 clamping surface part
11 clamping surface part
12 rounding
13 diameter
14 height
15 distance
16 reinforcing web
17 height

The invention claimed is:

1. A bearing cover for a split bearing arrangement which comprises a bearing block in addition to the bearing cover, the bearing cover having
a clamping surface which in the assembled state of the bearing arrangement fits against a counter clamping surface of the bearing block,
at least one projection being formed on the clamping surface and projecting from the clamping surface, which projection is pushable into the counter clamping surface of the bearing block, wherein the projection has a round or round-convex cross-sectional form in a plan view of the clamping surface, wherein the whole projection is in a form of a spherical segment or an ellipsoid segment, and
a bearing mount surface.

2. The bearing cover as claimed in claim 1, wherein a recess is formed in the clamping surface, wherein the projection is arranged between said recess and the bearing mount surface of the bearing cover.

3. The bearing cover as claimed in claim 1, wherein a transition from the clamping surface to the projection is designed to be rounded.

4. The bearing cover as claimed in claim 1, wherein the projection has a diameter of at least 0.2 mm and a maximum of 4 mm.

5. The bearing cover as claimed in claim 1, wherein the projection is arranged at a distance from a beginning of the bearing mount surface, which is at least 25% of the maximum diameter and a maximum of 300% of a maximum diameter of the projection.

6. A bearing arrangement comprising a bearing cover and a bearing block fitting against the latter, wherein the bearing cover is designed as claimed in claim 1.

* * * * *